(12) United States Patent
Williams et al.

(10) Patent No.: US 10,635,065 B2
(45) Date of Patent: Apr. 28, 2020

(54) DOMAIN MANAGEMENT AND ENVIRONMENTAL SETTINGS CONTROL IN A MANAGED USER DOMAIN

(71) Applicant: Time Warner Cable Enterprises LLC, St. Louis, MO (US)

(72) Inventors: Chris Williams, Chantilly, VA (US); Ben D. Hepworth, Liberty Hill, TX (US); Scott Ramsdell, Charlotte, NC (US); Dhananjay Lal, Chantilly, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 1217 days.

(21) Appl. No.: 14/508,158

(22) Filed: Oct. 7, 2014

(65) Prior Publication Data

US 2015/0309516 A1    Oct. 29, 2015

Related U.S. Application Data

(60) Provisional application No. 61/983,194, filed on Apr. 23, 2014.

(51) Int. Cl.
*G05B 15/00* (2006.01)
*G05B 19/042* (2006.01)
*G05D 23/19* (2006.01)

(52) U.S. Cl.
CPC ....... *G05B 19/042* (2013.01); *G05D 23/1904* (2013.01); *G05B 2219/23227* (2013.01)

(58) Field of Classification Search
CPC .................... G05B 19/042; G05D 23/1904
See application file for complete search history.

(56) References Cited

U.S. PATENT DOCUMENTS

| | | | | |
|---|---|---|---|---|
| 2006/0053447 A1* | 3/2006 | Krzyzanowski | .... | H04L 12/2816 725/40 |
| 2010/0262298 A1* | 10/2010 | Johnson | ................. | F24F 11/001 700/277 |
| 2013/0345882 A1* | 12/2013 | Dushane | ................ | G05B 15/02 700/276 |
| 2014/0002461 A1* | 1/2014 | Wang | .................... | G06T 11/206 345/440 |
| 2014/0358291 A1* | 12/2014 | Wells | ................. | G05D 23/1902 700/276 |

* cited by examiner

*Primary Examiner* — Wissam Rashid
(74) *Attorney, Agent, or Firm* — Armis IP Law, LLC

(57) ABSTRACT

A domain management resource monitors a behavior of a user controlling multiple resources disposed in a domain of a network environment. Based on the monitored behavior, the domain management resource identifies a repeated pattern of control in which the user controls a particular resource in the domain. The domain management resource derives a proposed control rule based on the repeated pattern of control. The proposed control specifies how to control the particular resource. The domain management resource presents the control rule for review and possible editing prior to programming the domain management resource to execute the control rule.

36 Claims, 10 Drawing Sheets

PLEASE SELECT A CATEGORY OF INTEREST IN WHICH
YOU WOULD LIKE US TO MONITOR CONDITIONS/EVENTS AND
PROPOSE CONTROL RULES:

[x] I WOULD LIKE TO SAVE MONEY ON ENERGY BILLS

[ ] I WOULD LIKE TO MONITOR ACTIVITY ASSOCIATED WITH
OCCUPANTS IN MY SUBSCRIBER DOMAIN

[ ] I WOULD LIKE TO AUTOMATE STORAGE OF VIDEO THAT
LIKELY WOULD BE OF INTEREST TO ME

[ ] I WOULD LIKE TO AUTOMATE CONTROL OF LIGHTING

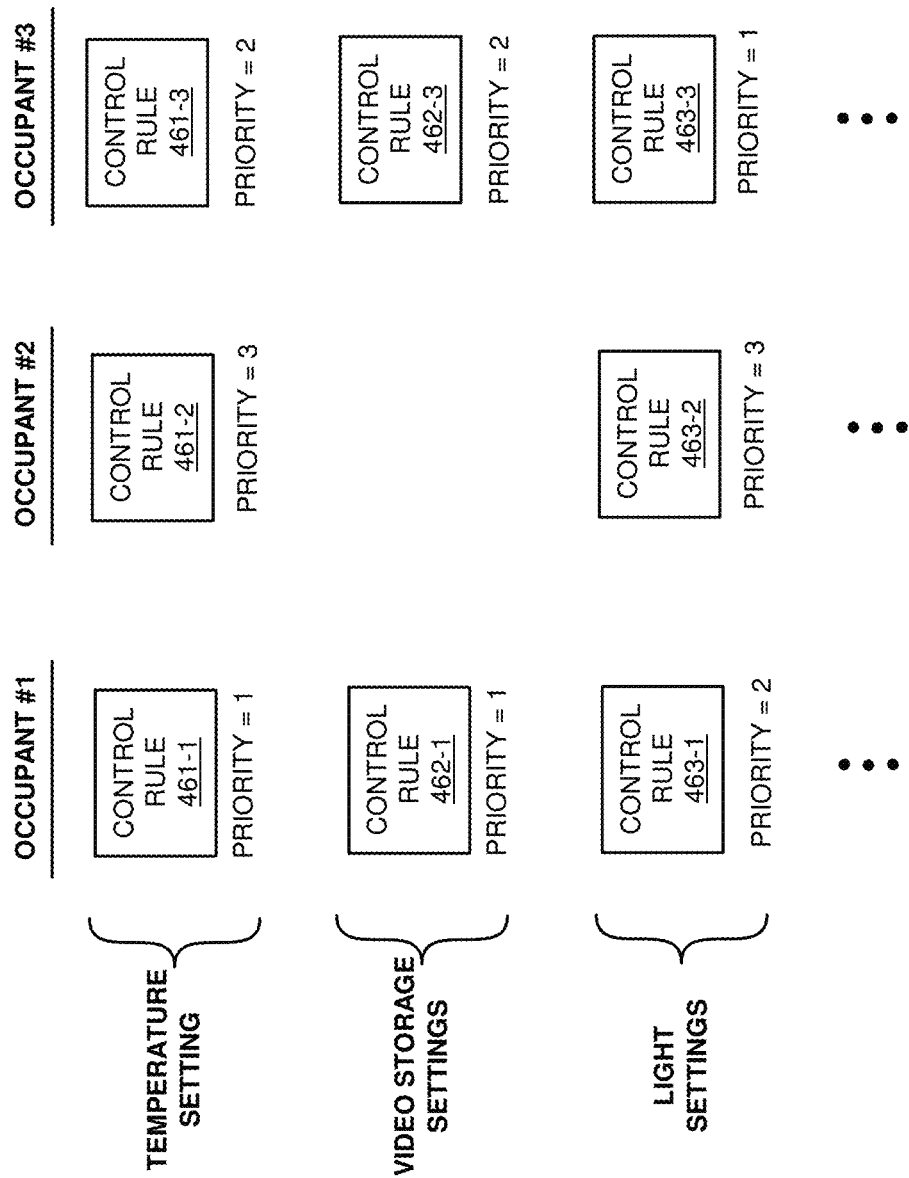

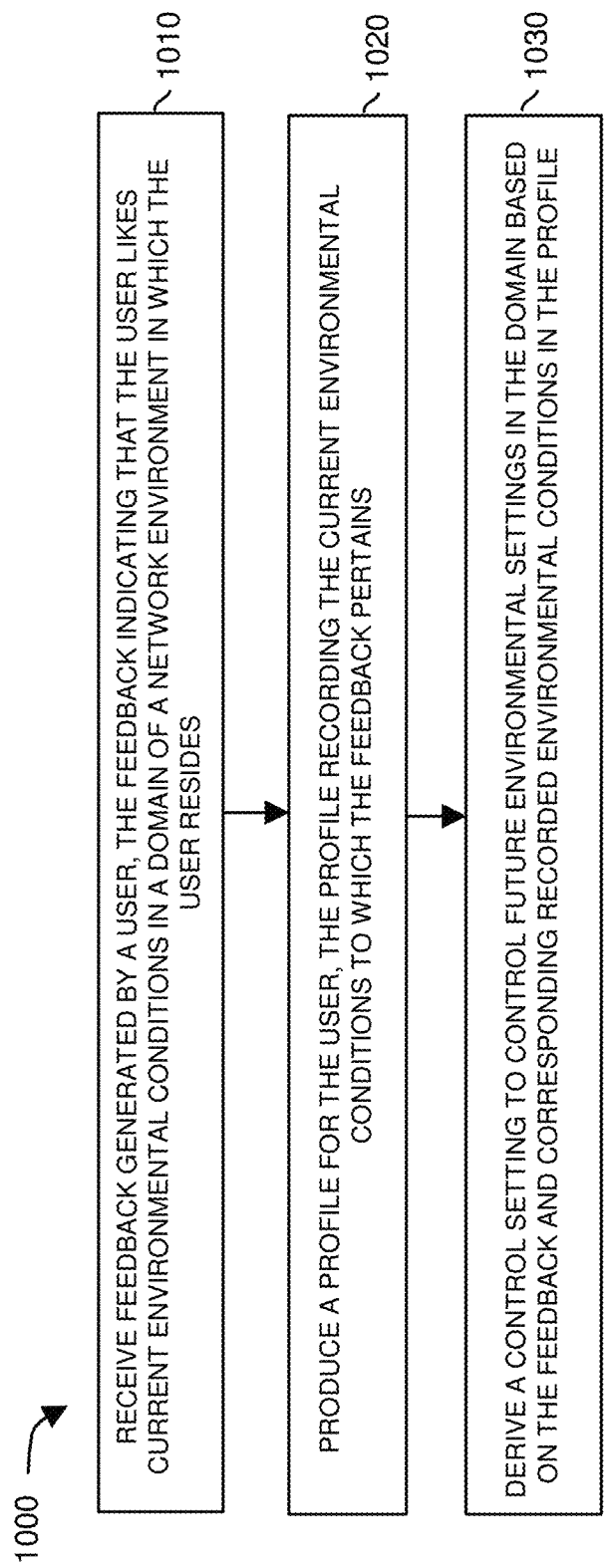

DOMAIN MANAGEMENT AND ENVIRONMENTAL SETTINGS CONTROL IN A MANAGED USER DOMAIN

RELATED APPLICATIONS

This application is related to and claims the benefit of earlier filed U.S. Provisional Patent Application Ser. No. 61/983,194 entitled "DOMAIN MANAGEMENT AND CONFIGURATION SETTINGS," filed on Apr. 23, 2014, the entire teachings of which are incorporated herein by this reference.

BACKGROUND

Conventional technology now includes so-called smart thermostats that implement software algorithms to reduce overall energy consumption (e.g., natural gas, oil, electricity, etc.) in a respective household.

One type of conventional smart thermostat monitors temperature settings inputted by a respective user in a household. For example, the user of the conventional smart thermostat is able to manually control the respective temperature setting of the thermostat up or down depending upon whether the user wants the temperature in the house to be warmer or colder. The conventional smart thermostat keeps track of the different settings.

Based on different temperatures selected over a time span, such as a week or a month, the smart thermostats detects a behavior of the respective user controlling the thermostat. In accordance with the detected behavior, the smart thermostat automatically produces a corresponding control schedule to control a respective temperature in house. Subsequent to generating a respective control schedule or modifying a control schedule, the smart thermostat automatically implements the control schedule to control future temperature settings in the household.

Thus, in accordance with conventional smart thermostats, detection of past temperature setting events provides a basis for the conventional smart controller to control future temperature settings in the respective house.

BRIEF DESCRIPTION OF EMBODIMENTS

Conventional techniques of automatically controlling a respective control device based on a history of prior settings suffer from deficiencies. For example, a user may program a respective household thermostat to adjust a setting of a respective house from a setting of 65° to the setting of 75° each weekday night at around 7 PM. The conventional smart thermostat detects this input and generates a schedule to automatically readjust the temperature of the house to 75° at 7 PM. Thus, a schedule can be learned.

Without further input from a user, the conventional smart thermostat automatically executes the learned schedule of controlling the thermostat. A downside of automatically executing a learned schedule is that execution of the schedule may result in undesirable temperature settings. In other words, the conventional smart thermostat may incorrectly assume that the user would like the conventional smart thermostat to automatically readjust settings under certain conditions. In such an instance, if the learned settings are incorrect, the user has to continuously and manually override the automatic settings learned and implemented by the conventional thermostat. Thus, a so-called conventional smart thermostat may be annoying to use because it requires constantly fighting the programmed settings.

Embodiments herein deviate with respect to conventional techniques. For example, embodiments herein include novel ways of producing and managing control settings associated with a respective domain such as a household, business, etc.

More specifically, in accordance with one embodiment, a domain management resource monitors a behavior of a user controlling one or more settings (e.g., thermostat settings, set top box settings, volume control settings, channel setting lighting settings, etc.) associated with resources disposed in a domain of a network environment. In one embodiment, the multiple resources are communicatively coupled to the domain management resource. Via respective communication links between the resources and the domain management resource, the domain management resource receives control information indicating input applied by the user to control each respective resource. Thus, via received control information, the domain management resource is informed and learns of the user settings applied to the controllable resources.

Based on the monitored behavior of the user controlling the one or more resources, the domain management resource identifies a repeated pattern of control in which the user controls at least one particular resource in the domain. On behalf of the user, the domain management resource utilizes the identified repeated pattern of control to derive a proposed rule (configuration setting) for the particular resource. For example, if a user performs the same action over and over again under particular conditions, the domain management resource generates a proposed rule. In one embodiment, the proposed rule (configuration setting) specifies how to control the particular resource under in different circumstances.

In addition to receiving the control input, the domain management resource may also monitor one or more environmental parameters such as time, air temperature, sound volume, channel setting, lighting, etc., associated with the domain at the time of receiving the control input. The domain management resource can be configured to identify correlations between occurrence of the control input with respect to different events or conditions in the domain. By way of non-limiting example embodiment, assume that each time a user watches a particular cable-television channel, the user controls light settings in a respective room in which a display screen resides to a particular intensity level. In accordance with this repeated pattern of control behavior, the domain management resource generates a proposed rule (configuration setting) indicating to automatically adjust the intensity of light in the room every time the domain management resource detects that the user has selected the particular cable-television channel for playback.

Prior to programming the domain management resource with a newly generated configuration setting (such as to control an intensity of ambient lighting based on selection of the particular channel), the domain management resource presents the proposed rule for review to a respective user in the subscriber domain. In one embodiment, the user is able to control whether the proposed rule is to be implemented by the domain management resource.

In certain instances, as described herein, the domain management resource can be configured to present the proposed rule for editing in case the user would like to change one or more parameters in the proposed rule before it is approved.

Embodiments herein are useful over conventional techniques because they provide the user with an option of whether or not to implement the proposed configuration setting. As previously discussed, technology such as conventional smart thermostats automatically implement a respective schedule without approval by a respective user. Accordingly, as mentioned, in certain instances, conventional smart thermostats are likely to control a respective temperature of a house to an undesired setting.

In accordance with further embodiments, the domain management resource can be configured to receive feedback generated by a user. The feedback can indicate whether the user likes current environmental conditions (environmental settings such as temperature setting, light setting, channel setting, volume setting, etc.) in a monitored domain of a network environment in which the user resides.

In one embodiment, the domain management resource produces a profile for the user based on the feedback. For example, the profile generated by the domain management resource can include a recording of the current environmental conditions and/or settings associated with controlled resources to which the feedback pertains. The feedback can indicate that the user likes or dislikes current environmental conditions and/or settings. The user can provide the feedback one or more times within a particular time span. The domain management resource can be configured to monitor the recorded environmental conditions and/or settings to determine a respective pattern of like or dislike environmental conditions and/or settings. The domain management resource analyzes the profile information to derive control settings (control rules) for the user. Based on the likes and or dislikes of the user, the domain management resource derives control information to control future environmental settings in the domain.

As previously discussed, the domain management resource can be configured to provide the user with an opportunity to edit the proposed configuration setting (rule) prior to the proposed configuration setting being presented to the user for selection.

Embodiments herein are useful over conventional techniques because they provide the user with the ability to provide useful feedback indicating conditions in a domain that the user finds favorable. Based on the user's likes, or dislikes, with respect to current settings or environmental conditions, the domain management resource generates control information (rules) to control the subscriber domain.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: monitor a behavior of a user controlling multiple resources disposed in a domain of a network environment, the multiple resources communicatively coupled to a domain management resource associated with the domain; based on the monitored behavior, identify a repeated pattern of control in which the user controls a particular resource in the domain; derive a control rule based on the repeated pattern of control, the control rule specifying how to control the particular resource; and presenting the control rule for review prior to programming the domain management resource with the configuration setting.

One or more embodiments herein include a computer readable storage medium and/or system having instructions stored thereon. The instructions, when executed by computer processor hardware, cause the computer processor hardware (such as in a security system) to: receive feedback generated by a user, the feedback indicating whether the user likes current environmental conditions in a domain of a network environment in which the user resides; produce a profile associated with the user, the profile recording the current environmental conditions to which the feedback pertains; and derive a configuration setting to control future environmental settings in the domain based on the feedback and corresponding recorded environmental conditions.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating installation of corresponding wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating different selectable categories in which to monitor control parameters according to embodiments herein.

FIG. 4 is an example diagram illustrating a detected hierarchy of control amongst multiple occupants in a subscriber domain according to embodiments herein.

FIGS. 9 and 10 are example diagrams illustrating methods according to embodiments herein.

Figure 1:
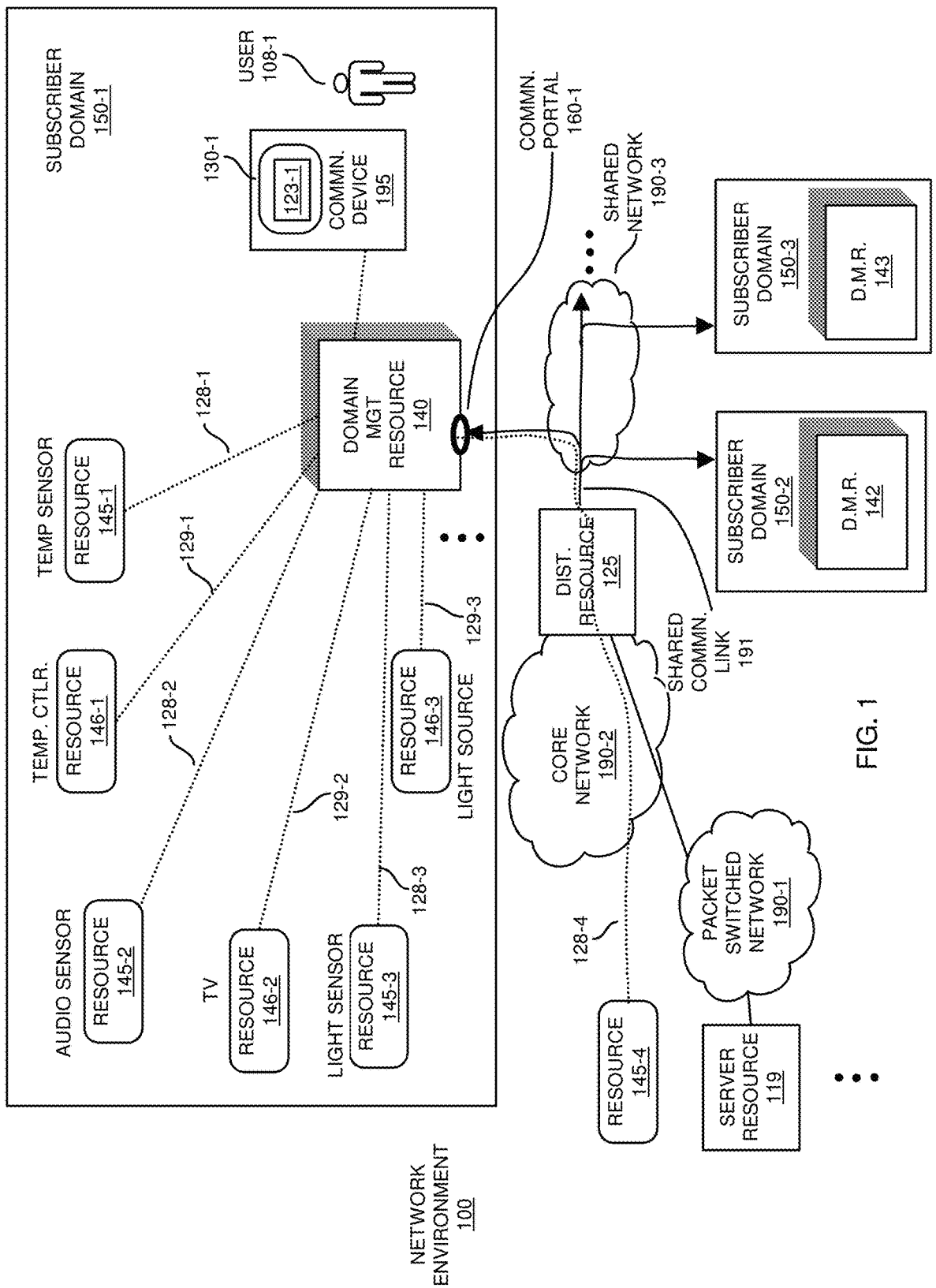
FIG. 1 is an example diagram illustrating a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

A domain management resource monitors occurrence of events and a behavior of a user controlling multiple resources disposed in a subscriber domain of a network environment. Based on the monitored behavior, the domain management resource identifies a repeated pattern of control in which the user controls one or more resources in the subscriber domain. The domain management resource derives a proposed control rule or configuration setting based on the repeated pattern of control. The proposed control rule or configuration setting specifies how to control the particular resource under certain conditions. In one embodiment, prior to programming the domain management resource to execute the control rule or configuration setting, the domain management resource presents the control rule for review and possible editing.

In accordance with further embodiments as further discussed below, a user provides feedback indicating whether they like certain environmental conditions or settings associated with the subscriber domain. Based on the feedback, the domain management resource learns conditions in the subscriber domain that the user finds desirable. In accordance with the feedback, the domain management resource generates control rules to control settings of resources/environmental conditions in the subscriber domain.

Now, more specifically, FIG. 1 is an example diagram illustrating a network environment according to embodiments herein.

As shown, network environment 100 includes multiple subscriber domains 150 (e.g., subscriber domain 150-1, subscriber domain 150-2, subscriber domain 150-3, and so on). Note that each of the subscriber domains 150 in network environment 100 can be any suitable type of domain such as a home environment, business environment, etc.

Assume in this non-limiting example embodiment, subscriber domain 150-1 represents a home environment or residence where a respective user 108-1 (and one or more other occupants) domiciles.

Each of one or more subscriber domains 150 includes a respective domain management resource 140. For example, as shown in this example embodiment, subscriber domain 150-1 includes domain management resource 140, subscriber domain 150-2 includes domain management resource 142, subscriber domain 150-2 includes domain management resource 143, and so on.

Each domain management resource enables occupants in a respective subscriber domain to monitor and control one or more aspects of the respective subscriber domain.

Note that functionality associated with domain management resource 140 can be performed in any suitable location. For example, subscriber domain 150-1 can include appropriate hardware and software to execute such functionality associated with a respective domain management resource. Additionally or alternatively, server resource 119 or other suitable resource can be configured to execute some or all of the functionality associated with a respective domain management resource.

In accordance with further embodiments, as mentioned, a respective domain management resource enables a respective subscriber to manage one or more resources residing in the respective subscriber domain.

More specifically, in this example embodiment, subscriber domain 150-1 includes controlled resource 146-1 (such as a temperature controller), controlled resource 146-2 (such as a television), controlled resource 146-3 (such as a light source), etc. In certain instances, each of the resources 146 can be controlled by the domain management resource 140 or by an occupant in the subscriber domain 150-1 physically controlling knobs, buttons, etc., of the respective resources 146.

Subscriber domain 150-1 can include resources 145 to detect environmental condition associated with subscriber domain 150-1. For example, subscriber domain 150-1 can include sensor resource 145-1 (such as a temperature sensor), sensor resource 145-2 (such as an audio sensor), sensor resource 145-3 (such as a light sensor), etc.

In accordance with further embodiments, each of the sensors can monitor a different environmental condition or parameter. For example, sensor resource 145-1 can be configured to monitor a temperature associated with subscriber domain 150-1; sensor resource 145-2 can be configured to monitor a volume of audio in the subscriber domain

150-1; sensor resource 145-3 can be configured to monitor optical energy in the subscriber domain 150-1; and so on.

The sensors in subscriber domain 150-1 can be used to control a corresponding resource in subscriber domain 150-1. For example domain management resource 140 can receive input from resource 145-3 indicating an intensity of light in the subscriber domain 150-1. The domain management resource 140 can control resource 146-3 (light source) to an appropriate level such that the resource 145-3 detects that the intensity of light is set to a desired level.

In the example embodiment shown in FIG. 1, each of the multiple resources 145 and 146 is communicatively coupled to the domain management resource 140 via a respective communication link. A respective communication link can be a wired or wireless communication link.

In this example embodiment, as shown, subscriber domain 150-1 includes a communication link 128-1 between resource 145-1 and domain management resource 140; subscriber domain 150-1 includes a communication link 128-2 between resource 145-2 and domain management resource 140; subscriber domain 150-1 includes a communication link 128-3 between resource 145-3 and domain management resource 140; subscriber domain 150-1 includes a communication link 129-1 between resource 146-1 and domain management resource 140; subscriber domain 150-1 includes a communication link 129-2 between resource 146-2 and domain management resource 140; subscriber domain 150-1 includes a communication link 129-3 between resource 146-3 and domain management resource 140; and so on.

In certain instances, resource 145 resides outside of subscriber domain 150-1. Via communication link 128-4 (which may include a cellular phone link, WiFi™ link, etc.) and communications through communication port 160-1, the domain management resource 140 is able to receive and transmit communications to resource 145-4. The communication link 128-4 includes a portion of a communication path between distribution resource 125 and domain to management resource 140. In one embodiment, distribution resource 125 is a cable modem termination system. The domain management resource 140 can include or be communicatively coupled to a cable modem resource.

In one embodiment, a respective communication link supports two-way communications enabling: i) the domain management resource 140 to communicate with the respective resource, and ii) the respective resource to communicate with the domain management resource 140. In certain cases, a respective communication link may support only one-way communications such as from a sensor resource to the domain management resource 140.

The domain management resource 140 monitors a behavior of one or more occupants in subscriber domain 150-1 controlling multiple resources 146 (e.g., resource 146-1, resource 146-2, resource 146-3, . . . ). The occupant's behavior can be determined based on any suitable information such as communications received from sensor resources 145 or controlled resources 146.

For example, the domain management resource 140 can be configured to receive temperature control setting information associated with controlled resource 146-1 (such as a thermostat); the domain management resource 140 can be configured to receive television control setting information associated with controlled resource 146-2 (such as a television); the domain management resource 140 receives light control setting information associated with controlled resource 146-3 (such as a lighting resource); and so on. The domain management resource 140 can be configured to continuously monitor control settings associated with resources in subscriber domain 150-1. Thus, via communications from controlled resources 146, the domain management resource 140 is aware of the different control settings over time.

Additionally, as mentioned, the domain management resource 140 can be configured to receive communications from one or more sensor resources 145 to determine behavior of one or more occupants in subscriber domain 150-1. For example, the domain management resource 140 can receive communications from sensor resource 145-1 indicating a temperature setting in subscriber domain 150-1; the domain management resource 140 can receive communications from sensor resource 145-2 indicating a volume setting in subscriber domain 150-1; the domain management resource 140 can receive communications from sensor resource 145-3 indicating ambient light setting in subscriber domain 150-1; and so on.

In accordance with further embodiments, the domain management resource 140 enables a respective user 108-1 (or group of users associated with subscriber domain 150-1) to control one or more of the resources 146 from a remote location. For example, the user 108-1 can operate communication device 195 (such as a mobile communication device) inside or outside of subscriber domain 150-1 to communicate with domain management resource 140.

To control a respective resource in subscriber domain 150-1, the user 108-1 inputs one or more control commands into the communication device 195 to control a specified resource. The communication device 195 transmits the one or more control commands to domain management resource 140. The domain management resource 140 communicates the received commands to a respective resource.

In certain instances, as mentioned, each of one or more of the controlled resources 146 (such as thermostat, television, light source, etc.) includes a control interface enabling the user 108-1 to directly control the resource without communicating through the domain management resource 140. For example, the resource 146-1 (thermostat) can include a set of one or more buttons, knobs, etc., operated by the user 108-1 to increase or decrease a temperature setting associated with subscriber domain 150-1; the resource 146-2 can include a set of one or more buttons, knobs, etc., operated by the user 108-1 to make a channel selection, control volume, etc.; the resource 146-3 can include a set of one or more buttons, knobs, etc., operated by the user 108-1 to increase or decrease a magnitude of light outputted by resource 146-3 in subscriber domain 150-1; and so on.

Subscriber domain 150-1 can also include one or more resources such as a camera to monitor and detect which of the occupants in subscriber domain 150-1 performs different control functions.

Figure 2:
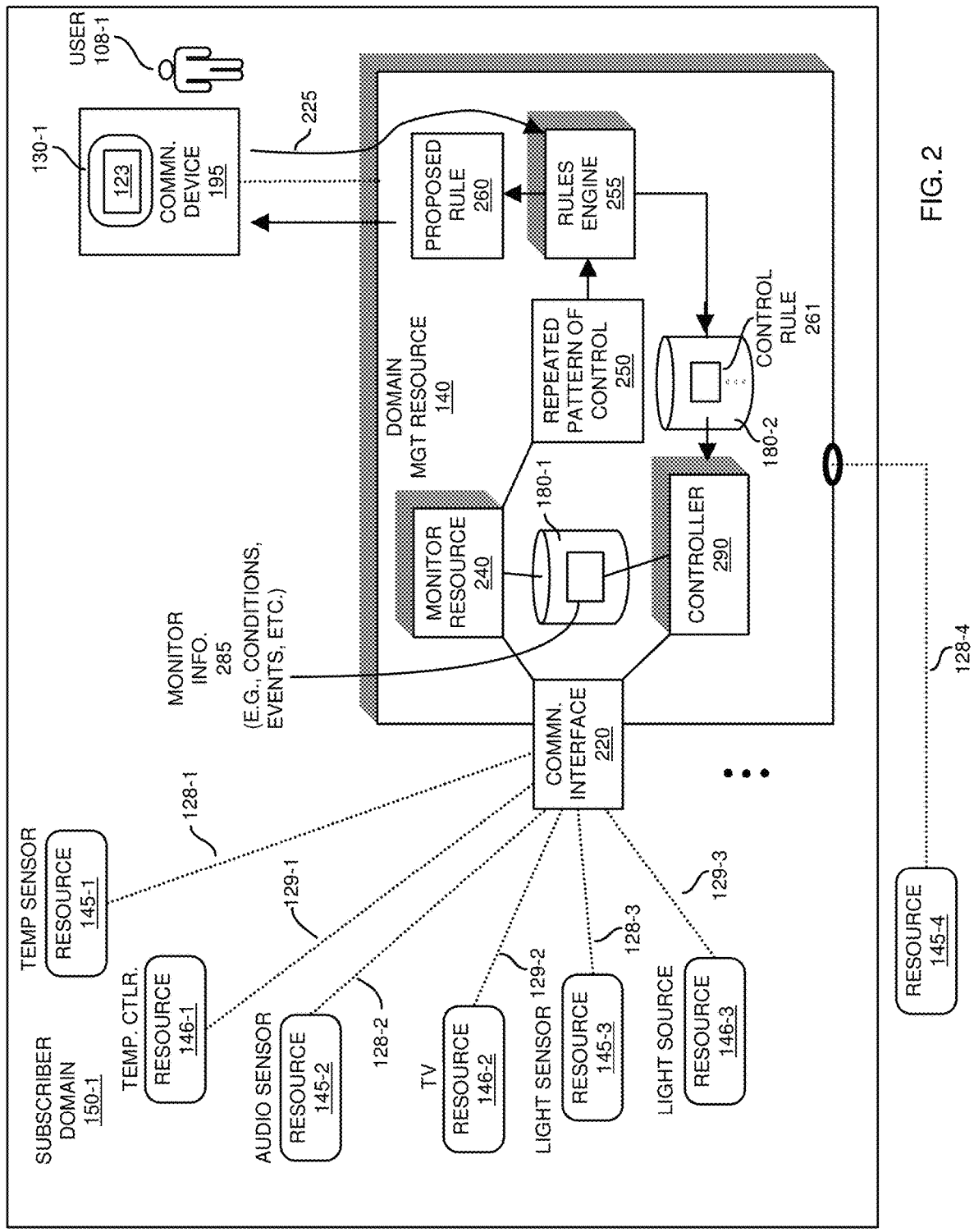
FIG. 2 is a more detailed example block diagram illustrating a subscriber domain including a domain management resource and corresponding sensors and controllable resources according to embodiments herein.

FIG. 2 is a more detailed example block diagram of a domain management resource and corresponding subscriber domain according to embodiments herein.

In this example embodiment, domain management resource 140 includes monitor resource 240. Via communications through communication interface 220 to resources 145 and 146, the monitor resource 240 detects occurrence of different events (such as a change in control settings) and/or conditions in subscriber domain 150-1. In one embodiment, monitor resource 240 stores monitor information 285 (such as current environmental conditions, occurrence of events, etc.) in repository 180-1. Thus, via monitor information 285, domain management resource 140 keeps track of different settings associated with resources 146 and/or environmental conditions as sensed by resources 145.

Via communications received from resources 145 and 146, the domain management resource 140 analyzes monitor information 285 to identify a behavior of respective one or more occupants controlling resources 146 or environmental conditions in subscriber domain 150-1. In one embodiment, based on the monitored behavior, the domain management resource 140 identifies a repeated pattern of control 250 in which the user 108-1 repeatedly controls one or more resources and/or environmental conditions associated with the subscriber domain 150-1.

As further shown, the domain management resource 140 includes rules engine 255. Rules engine 255 uses the repeated pattern of control 250 to produce a proposed control rule 260 specifying how to control the set of one or more resources 146. The repeated pattern of control 250 can be a detected behavior such as that the user 108-1 adjust a temperature of the subscriber domain to 75° at 7 PM every night. This condition or control setting can be sensed in any number of ways.

For example, the monitor information 285 can indicate that the user 108-1 controls the resource 146-1 to 75° every night at 7 PM. Alternatively, the monitor information 285 can monitor temperature as sensed by resource 145-1. The communications received from the resource 145-1 (temperature sensor) can indicate that the temperature of the subscriber domain 150-1 changes from 65° to 75° around 7 PM every night.

The domain management resource includes rules engine 255 configured to generate a proposed rule 260 based on the identified repeated pattern of control 250. As mentioned, assume in this example embodiment that the monitor information 285 indicates that the respective user 108-1 controls resource 146-1 (thermostat) to 75° each day at around 7 PM. In this instance, on behalf of the user 108-1, the domain management resource 140 utilizes the identified repeated pattern of control (setting of thermostat to 75° at 7 PM) to derive a proposed rule for controlling the resource 146-1. In one embodiment, the proposed rule 260 specifies proposes to adjust the temperature of subscriber domain 150-1 to be 75° each day at 7 PM.

Prior to programming the domain management resource 140 with the newly generated proposed rule 260 (such as to control the temperature of subscriber domain 150-1 to 75° each night at 7 PM), the domain management resource 140 presents the proposed rule 260 for review to user 108-1.

Display of the proposed rule 260 can be done in any suitable manner. In one embodiment, the domain management resource 140 initiates display of the proposed rule 260 in graphical user interface 123 displayed on display screen 130-1 of communication device 195. Accordingly, prior to a rule being implemented, the user 108-1 is able to view proposed rule 260 and determine whether or not to program domain management resource 140 to execute the proposed rule 260.

In accordance with further embodiments, the user 108-1 can edit the proposed rule 260 as displayed in graphical user interface 123 on display screen 130-1. For example, the proposed rule 260 presented to the user 108-1 can indicate to modify the temperature setting of subscriber domain 150-1 to 75° at 7 PM every night. The user may decide to edit the proposed rule 260 prior to approval. For example, the user may change the temperature from 75 degrees to 73°; the user 108-1 may change the time and 7 PM to 6:30 PM; and so on.

Assume further in this example embodiment that the user 108-1 approves of the proposed rule 260 and provides input 225 indicating to implement the proposed rule 260. In such an instance, the rules engine 255 of domain management resource 140 converts the proposed rule 260 into control rule 261 and stores it in repository 180-2.

Subsequent to storage, the controller 290 utilizes the control rule 261 to perform future control of one or more resources on behalf of the user 108-1 in a manner as detected in the repeated pattern of control 250. The control rule 261 can be implemented in any suitable manner. For example, in one embodiment, the controller resource 290 can monitor the current time. In accordance with the control rule 261, when the controller 290 detects that it 7 PM, the controller 290 communicates with the corresponding resource 146-1 (thermostat) to set the temperature setting to 75°.

If the user 108-1 decides that he does not want to program the domain management resource 140 in accordance with the proposed rule 260, the user 108-1 operates communication device 195 to notify rules engine 255 not to implement the proposed rule 260. In such an instance, the domain management resource 140 discards the proposed rule 260 and does not produce a corresponding control rule 261 for execution by controller 290.

Embodiments herein are useful over conventional techniques because they provide the user 108-1 with an option of whether or not to implement the proposed rule 260 purposes of controlling subscriber domain 150-1. As previously discussed, technology such as conventional smart thermostats automatically implement a respective schedule without approval by a respective user. Accordingly, as mentioned, in certain instances, conventional smart thermostats are likely to control a respective temperature of a house to an undesired setting.

As another example of identifying correlations and presenting proposed rules, assume that the monitor resource 240 detects that each time a user watches cable-television channel 620 on resource 146-2 (such as a television), the user 108-1 controls light settings in a room to a particular intensity level.

In accordance with this detected repeated pattern of control behavior (i.e., setting light levels to the particular intensity level when watching the particular cable-television channel 620), the domain management resource 140 generates a proposed rule indicating to automatically adjust the intensity of light in the room every time the domain management resource 140 detects that the user 108-1 has selected the particular cable-television channel 620 for playback.

In a manner as previously discussed, the domain management resource 140 presents the proposed rule for review by user 108-1 on a suitable display screen such as display screen 130-1 on communication device 195. If the user 108-1 approves of programming the domain management resource 140 with the proposed rule (e.g., to control setting light levels to the particular intensity level the user watches channel 620), the rules engine 255 of domain management resource 140 creates a corresponding control rule for storage in repository 180-2.

Controller 290 monitors current conditions of subscriber domain 150-1 and provides control in accordance with the control rule. In this example embodiment, assume that the controller 290 detects a condition such as that the user 108-1 controls resource 146-2 (television) to play back content received on channel 620. In accordance with the respective control rule, and in response to detecting selection of channel 620, the controller 290 controls light settings in subscriber domain 150-1 to the particular intensity level.

As another example, the domain management resource 140 can monitor volume settings associated with resource 146-2 (television) as the user 108-1 switches (channel hops) amongst different channels for viewing. The domain management resource 140 can detect that when the user watches channel 625, the user repeatedly sets the volume to 22; the domain management resource 140 can detect that when the user watches channel 628, the user repeatedly sets the volume to 18; and so on.

In accordance with this detected repeated pattern of control, the rules engine 255 of domain management resource 140 generates corresponding proposed rules for viewing by respective user 108-1. Assuming that the user 108-1 approves of the rules, the rules engine 255 converts the proposed rules into control rules implemented by controller 290. Accordingly, in accordance with the control rules, each time the controller 290 detects that the user switches to view channel 625 on resource 146-2 (television), the controller sets the volume to 22; each time the controller 290 detects that the user switches to view channel 628 on resource 146-2 (television), the controller sets the volume to 18; and so on.

In accordance with another example embodiment, assume that the domain management resource 140 detects that the temperature of the subscriber domain as indicated by resource 145-1 (temperature sensor) is set to 75° every time the user turns on resource 146-2 (television). In such an instance, the monitor resource 240 can be configured to generate a respected repeated pattern of control 250 indicating that the temperature of the subscriber domain 150-1 is often set to 75° when the user watches resource 146-2 (television). In accordance with this detected repeated pattern of control, the rules engine 255 generates a proposed rule 260 indicating to adjust the temperature of subscriber domain 150-1 to 75° any time that the user activates resource 146-2 (television). Assuming that the user 108-1 approves of the proposed rule, the rules engine 255 creates a corresponding control rule for execution by controller 290. When the controller 290 detects a condition in which the user watches resource 146-2 (television), the controller 290 adjusts the temperature in the subscriber domain 150-1 to be 75°. This control action (such as setting the temperature to 75°) can be achieved by communicating appropriate control information from domain management resource 142 resource 146-1 (thermostat), setting the temperature to 75°.

Thus, in accordance with one embodiment, the controller 290 can be configured to: monitor current environmental conditions (such as that a user watches television) in the subscriber domain 150-1; compare the current environmental conditions (such as that the user 108-1 in the subscriber domain 150-1 watches television) of the network environment 100 to control parameters (temperature) as specified by the control rule 261; and control one or more resources (such as the resource 146-1) on behalf of the user 108-1 in a manner as specified by the control rule 261.

In accordance with another example embodiment, assume that the domain management resource 140 detects that the lights in subscriber domain 150-1 are typically turned off when the temperature of the subscriber domain is less than 65°. In accordance with this detected repeated pattern of control, the monitor resource 240 can be configured to generate a respective repeated pattern of control 250 indicating that resource 146-3 (a light source) should be off when the temperature in subscriber domain as indicated by resource 145-1 (temperature sensor) is below 65°. In accordance with this detected repeated pattern of control, the rules engine 255 generates a proposed rule. Assuming that the user 108-1 approves of the proposed rule, the rules engine 255 creates a corresponding control rule for execution by controller 290. When the controller 290 detects a condition in which the temperature (environmental conditions) associated with subscriber domain 150-1 is below 65°, the controller 290 communicates over communication link 129-3 to turn resource 146 (lights) to an off state.

Thus, in accordance with one embodiment, the controller 290 can be configured to: monitor current environmental conditions (such as a temperature setting) in the subscriber domain 150-1; compare the current environmental conditions (such as the current temperature setting) of the network environment 100 to control parameters (such as a 65° threshold value) as specified by the control rule; and control one or more resources (such as the resource 146-3) to an OFF state if the temperature in subscriber domain 150-1 is less than the 65° threshold value.

As a further example, the domain management resource 140 can be configured to detect that a user in subscriber domain 150-1 adjusts a respective thermostat everyday at 7 pm to 70 degrees. After detecting a certain repetitive frequency of this control setting, the domain management resource 140 can be configured to generate a proposed control rule. Upon presenting the proposed rule to a user, the domain management resource can provide a notification to the user in subscriber domain 150-1 such as "You have adjusted your thermostat every day for the past 7 days to 70 degrees at 7 pm. Click this box if you would like to enable a rule that will automatically make this adjustment for you in the future."

As a further example, a user 108-1 in subscriber domain 150-1 can purchase a water sensor to monitor their water system. The water sensor may trigger multiple times in one month. In such an instance, the domain management resource 140 can be configured to generate a notification to the user 108-1 suggesting the user 108-1 call a local professional plumber to fix a respective leak.

As yet a further example, the domain management resource 140 can be configured to detect that a user 108-1 arrives at home (subscriber domain 150-1) 10 days in a row at 7 pm and turns on the TV and tunes to channel X news programming. On the 11th day, the domain management resource can be configured to detect that the user did not arrive home at 7:00 PM. The domain management resource 140 detects this extreme change in trend and automatically triggers a respective digital video recorder in subscriber domain 150-1 to record the channel X news program.

As yet a further example, a user 108-1 that subscribes to 24×7 video recording may leave the subscriber domain 150-1 everyday from 10 am-1 pm. Each time the user 108-1 returns, the domain management resource 140 detects that user logs into a respective subscriber portal and reviews video from the previous hour 12-1 pm. After the domain management resource 140 detects 5 occurrences of these events within a 10 day period, on the 11th day, the domain management resource 140 automatically records a video clip during the 12-1 pm time period. The domain management resource 140 can be configured to generate a proposed control rule to automatically record at this time everyday.

Habits of the one or more parties associated with subscriber domain 150-1 can change over time. In other words, old control rules 261 can become outdated. It should be noted that after creating one or more control rules 261, the monitor resource 240 can continue to monitor habits of one or more parties associated with the subscriber domain 150-1. In one embodiment, when the rules engine 255 detects that an updated repeated pattern of control 250 produced by the monitor resource 240 is different than the current control rules 261 (or because the user 108-1 overrides settings by controller 290 and current control rules 261), the rules engine 255 generates a proposed change to the current control rules 261. In such an instance, after detecting a new pattern of control 250, the rules engine 255 can be configured to forward a newly proposed rule to user 108-1 in a similar manner as previously discussed. If the user 108-1 or other suitable entity selects the newly proposed rule (which would override an old control rule 261), the rules engine 255 updates the appropriate one or more control rules 261 associated with the subscriber domain 150-1 in accordance with the newly detected pattern of control 250 approved and selected proposed new rule. Thus, according to embodiments herein, the domain management resource 140 and corresponding components (such as monitor resource 240, rules engine 255, controller 290, etc.) can be configured to dynamically update control rules 261 depending upon a newly detected pattern of control 250. The rules engine 255 can be configured to automatically update old control rules. If desired, as mentioned, updating of old control rules may require approval from a respective occupant (such as user 108-1) associated with the subscriber domain 150-1.

FIG. 3 is an example diagram illustrating different categories in which to monitor control parameters according to embodiments herein.

In accordance with further embodiments, the user 108-1 in subscriber domain 150-1 can select amongst different possible categories to monitor conditions, events, control settings, etc., associated with subscriber domain 150-1 and propose suitable control rules.

For example, as shown in graphical user interface 123-1 on display screen 130-1, the domain management resource notifies the user 108-1 of the different categories in which the domain management resource 140 can be configured to detected repeated pattern of control and propose corresponding control rules. As shown, the domain management resource 140 prompts the user 108-1 to select a category of interest in which the user 108-1 would like the domain management resource 140 can monitor conditions/bands and propose corresponding control rules.

Assume that the user 108-1 selects the category "I would like to save money on energy bills." In such an instance, the domain management resource 140 would monitor conditions, events, control input, etc., and propose control rules that would help the user 108-1 to save money on energy. In accordance with such an embodiment, the domain management resource 140 may detect that a particular room in subscriber domain 150-1 (such as a house) is not occupied between 11 PM and 6 AM. In such an instance, the domain management resource 140 can be configured to produce a propose control rule to lower a temperature of the particular room to 65° between 11 PM and 6 AM. In a manner as previously discussed, domain management resource 140 presents the proposed control rule for review because the particular resource falls within a category of interest as selected by the user. The user 108—one can then select proposed rule to control the temperature the particular room to 65° between 11 PM and 6 AM.

In accordance with further embodiments, the domain management resource 140 can be configured to receive temperature readings from one or more sensor resources located in subscriber domain 150-1 to create a time based thermal map of the house. This received information can be combined with sun light levels measured by light detectors throughout the subscriber domain 150-1. The domain management resource 140 can produce occupancy data indicating presence of occupants in the subscriber domain 150-1 based on feedback from additional sensors (such as motion, infrared sensors, capacitance sensors, etc.) disposed in subscriber domain 150-1. The domain management resource 140 or other suitable resource can be configured to analyze the collected in conjunction with local weather data and sunlight trajectory data to determine an optimal balance of controlling levels of natural lighting, temperature, etc.

The optimal control balance (as indicated by generated control information) may depend on a level of detected occupancy in the subscriber domain 150-1. The domain management resource 140 receives the control information and utilizes the control information to adjust shades, blinds, smart glass windows, HVAC dampers, lighting systems, etc. As described herein, the domain management resource 140 can be configured to monitor user feedback from simple manual adjustments (such as raising temperature control settings, lowering light levels, etc.). The control information can be used to determine the most energy efficient means of achieving a desired user action.

FIG. 4 is an example diagram illustrating a detected hierarchy of control amongst occupants in a subscriber domain according to embodiments herein.

In accordance with further embodiments, the control rules generated by the domain management resource 140 can be associated with different occupants in the subscriber domain 150-1. For example, the domain management resource 140 can receive input indicating which of the users performs different control functions in subscriber domain 150-1. As previously discussed, in one embodiment, the subscriber domain 150-1 includes one or more cameras monitoring which of the occupants in subscriber domain performs different control operations. Based on detected repeated patterns of control for each occupant, the domain manager resource 140 produces a different proposed rule and corresponding control rule for each of the different occupants in a manner as discussed above.

In this example embodiment, assume that the domain management resource 140 produces control rule 461-1 based on monitoring occupant #1 controlling temperature settings in subscriber domain 150-1; domain management resource 140 produces control rule 461-2 based on monitoring occupant #2 controlling temperature settings in subscriber domain 150-1; the domain management resource 140 produces control 461-3 based on monitoring occupant #3 controlling temperature settings in the subscriber domain 150-1; and so on. Thus, the temperature settings category includes control rule 461-1, control rule 461-2, and a control rule 461-3.

Assume that the domain management resource 140 produces control rule 462-1 based on monitoring occupant #1 controlling video storage settings in subscriber domain 150-1; domain management resource 140 produces control rule 462-3 based on monitoring occupant #3 controlling video storage settings in subscriber domain 150-1. Thus, the video storage settings category includes control rule 462-1 and 462-3.

Assume that the domain management resource 140 produces control rule 463-1 based on monitoring occupant #1 controlling light settings in subscriber domain 150-1; domain management resource 140 produces control rule 463-2 based on monitoring occupant #2 controlling light settings in subscriber domain 150-1; domain management resource 140 produces control rule 463-3 based on monitoring occupant #3 controlling light settings in subscriber domain 150-1. Thus, the light setting category includes control rule 463-1, 463-2, and 462-3.

As shown, the domain management resource 140 associates the proposed control rules with each respective user (occupant). In any suitable manner as discussed above, when the domain management resource 140 detects presence of a particular occupant in the subscriber domain 150-1, the domain management resource 140 controls one or more corresponding resources in subscriber domain 150-1 in accordance with the corresponding rule.

In a first example, assume that the domain management resource 140 detects presence of only occupant #1 in the subscriber domain 150-1. In such an instance, in response to detecting such a condition, the controller 290 of domain management resource 140 maps the identity of occupant #1 to control rule 461-1 and controls temperature settings in subscriber domain 150-1 in accordance with control rule 461-1.

In a second example, assume that the domain management resource 140 detects presence of only occupant #2 in the subscriber domain 150-1. In such an instance, in response to detecting such a condition, the controller 290 of domain management resource 140 maps the identity of occupant #2 to control rule 461-1 and controls temperature settings in subscriber domain 150-1 in accordance with control rule 461-2.

In a third example, assume that the domain management resource 140 detects presence of only occupant #3 in the subscriber domain 150-1. In such an instance, in response to detecting such a condition, the controller 290 of domain management resource 140 maps the identity of occupant #3 to control rule 461-1 and controls temperature settings in subscriber domain 150-1 in accordance with control rule 461-3.

Accordingly, the domain management resource 140 can detect different occupants in the subscriber domain 150-1 and control corresponding settings in accordance with the respective occupant.

In accordance with yet further embodiments, the domain management resource 140 can be configured to receive input indicating a control hierarchy associated with occupant #1, occupant #2, occupant #3, etc. The input can be a command from a respective user 108-1 in subscriber domain 150-1 indicating a priority of executing the different control rules for each of the different occupants. For example, the input can be a specific command received from the user 108-1 indicating a priority associated with each of the control rules or persons in a respective category (such as temperature setting, video stored settings, might settings, etc.). Accordingly, a respective administrator occupant in the subscriber domain 150-1 can specify a ranking or priority associated with the different occupants and/or control rules in each category.

In accordance with alternative embodiments, note that the domain manager resource 140-1 can be configured to learn the hierarchy (priority) associated with the control rules based upon monitoring activity and/or environmental conditions in the respective subscriber domain 150-1. For example, based on input received from monitoring the resources 145 and 146, the domain management resource 140-1 can detect that occupant #1 always controls the corresponding temperature settings in subscriber domain 150-1, even though occupants #2 and #3 also may be present in the subscriber domain. In such an instance, the domain management resource 140 ranks the control rule 461-1 associated with occupant #1 as a highest as priority in the temperature settings category.

Further in this example embodiment, based on monitoring of the resources 145 and 146, the domain management resource 140-1 can detect that occupant #3 controls the corresponding temperature settings in subscriber domain 150-1, even though occupant #2 also may be present in the subscriber domain. In such an instance, the domain management resource 140 ranks the control rule 461-3 associated with occupant #3 as high as a next highest priority (priority=2, beneath occupant #1) in the temperature settings category.

Further in this example embodiment, based on monitoring of the resources 145 and 146, the domain management resource 140-1 can detect that occupant #2 is lowest in the priority ranking. Accordingly, in this instance, the domain management resource 140 ranks the control rule 461-2 associated with occupant #2 as a lowest priority (beneath occupant #3) in the temperature settings category.

Thus, embodiments herein can include ranking the different control rules associated with each of the occupants.

Assume that the domain management resource 140 detects presence of occupant #1, occupant #2 and occupant #3 in the subscriber domain. In such an instance, the domain management resource 140 utilizes the control hierarchy (priority) in FIG. 4 to identify a ranking of the different occupants with respect to each other. In response to detecting that occupant #1 has the highest priority in the temperature settings category, the domain management resource 140 utilizes control rule 461-1 to control temperature settings in subscriber domain 150-1. In response to detecting that occupant #3 has the highest priority in the light settings category, the domain management resource 140 utilizes control rule 463-3 to control ambient light settings in subscriber domain 150-1.

Assume that the domain management resource 140 detects presence of only occupant #2 and occupant #3 in the subscriber domain 150-1. In such an instance, the domain management resource 140 again utilizes the control hierarchy (priority) to identify a ranking of the different occupants with respect to each other. In response to detecting that occupant #3 has the highest priority in both the temperature settings category and light settings category, the demand management resource 140: i) utilizes control rule 461-3 to control temperature settings in subscriber domain 150-1; and ii) utilizes control rule 463-3 to control ambient light settings in subscriber domain 150-1.

As discussed above, if only occupant #3 is detected as being present in the subscriber domain 150-1, the domain management resource controls the temperature settings associated with the subscriber domain 150-1 in accordance with control rule 461-2. Additionally, in such an instance, the domain management resource 140 controls light settings associated with the subscriber domain 150-1 in accordance with control rule 463-2.

Implementation of video stored settings may not be dependent upon whether the occupants are present in the subscriber domain 150-1. For example, with respect to video storage in subscriber domain 150-1, the domain management resource 140 can be configured to execute control rule 462-1 associated with occupant #1 over control rule 462-3 associated with occupant #3. Thus, if there is a conflict when storing requested video content, the domain management resource 140 will store content associated with occupant #1 because they have a higher priority.

Figure 5:
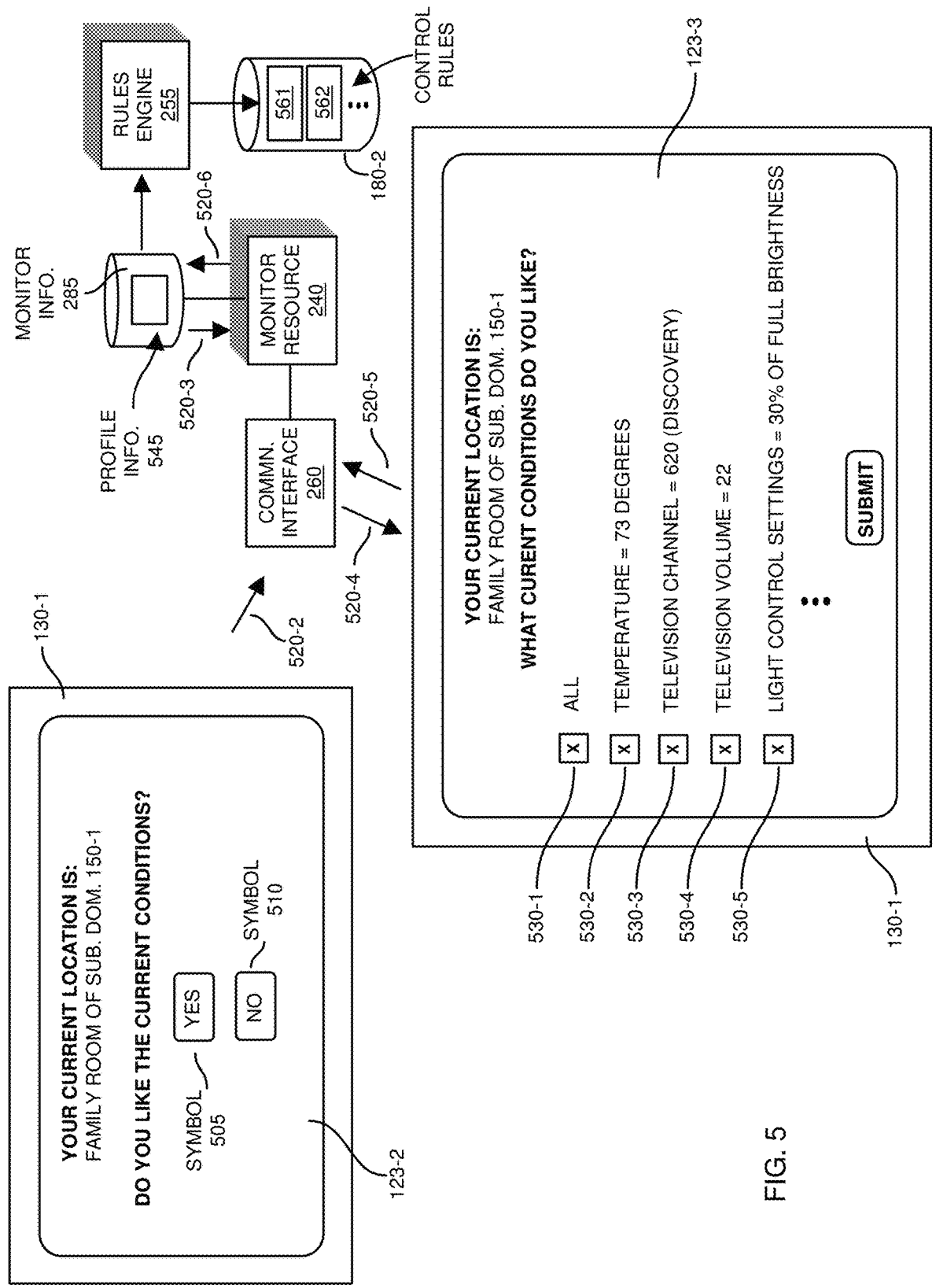
FIG. 5 is an example diagram illustrating a user providing feedback according to embodiments herein.

FIG. 5 is an example diagram illustrating a user providing feedback according to embodiments herein.

In accordance with further embodiments, in addition to or as an alternative to detecting repeated patterns of control as discussed above, the domain management resource 140 can be configured to receive feedback generated by one or more occupants in subscriber domain 150-1. The feedback can indicate whether the respective occupant likes current control settings and/or environmental conditions (environmental settings such as temperature setting, light setting, channel setting, volume setting, etc.) in a monitored domain of a network environment 100 in which the occupant resides. As described herein, the received feedback is useful towards generation of corresponding control rules to control resources in the subscriber domain.

As shown, the user 108-1 can operate the communication device 195 to initiate display of graphical user interface 123-2 on corresponding display screen 130-1. Assume that the monitor resource 240 detects that the current location of the user 108-1 is the family room on subscriber domain 150-1.

In this example embodiment, graphical user interface 123-2 enables the respective user 108-1 to provide feedback indicating whether or not the user 108-1 likes the current conditions associated with family room on subscriber domain 150-1. For example, if desired, the user 108-1 operating communication device 195 can select symbol 505 in graphical user interface 123-2 on display screen 130-1 to indicate that they currently like at least one condition (such as temperature, a channel setting of a television, a volume setting of the television, lighting conditions, etc.) in the family room of subscriber domain 150-1. Alternatively, if the user does not like current conditions, the user 108-1 can select symbol 510 in graphical user interface 123-2 to indicate that they do not like at least one current environmental condition or control setting associated with the family room of subscriber domain 150-1.

Accordingly, embodiments herein can include initiating display of one or more selectable symbols (such as symbol 505, symbol 510, etc.) on a display screen 130-1 viewed by a respective user 108-1. Selection of selectable symbol 505 in this example produces feedback indicating that the user likes the current environmental conditions of the domain around a time of the selection.

Assume in this example that the user 108-1 selects symbol 505. In response to selection symbol 505, the communication device 195 transmits communication 520-2 to monitor resource 240. The communication 520-2 notifies monitor resource 240 of domain management resource 140 that the user 108-1 currently likes at least one current condition associated with family room in subscriber domain 150-1.

In one embodiment, in response to receiving the notification, the monitor resource 240 produces corresponding profile information for storage in repository 180-1 indicating times when the corresponding user 108-1 likes the different control settings and/or environmental conditions. Based on the profile information 545 indicating desired settings/conditions, the rules engine 255 can be configured to produce a corresponding control rule such as control 561.

Note that the domain management resource 140 may delay producing a respective proposed control rule until a sufficient amount of feedback is received from the user indicating control settings and/or conditions like by the user (as indicated by selection of symbol 505 over multiple different occasions). After a sufficient amount of feedback is received, the monitor resource 240 analyzes the profile information 545 to detect repeated pattern of liked settings and/or conditions. The rules engine 255 generates one or more proposal control rules based on the repeated pattern of liked conditions. The rules engine 255 can be configured to present the proposed rule to user 108-1 in a manner as previously discussed. If desired, the user 108-1 can approve of the proposed rule for controlling subscriber domain 150-1 in the future.

Note that embodiments herein can enable a respective user 108-1 to more specifically indicate what specific environmental conditions and/or control settings are liked by the user 108-1 at a time of providing feedback (e.g., selecting symbol 505).

As a further example, assume that in response to receiving selection of symbol 505 indicating that the user 108-1 likes at least one of the current conditions associated with the family room of subscriber domain 150-1, the monitor resource 240 communicates (via messages 520-4) with the communication device 195 to display graphical user interface 123-3 on display screen 130-1.

Because the user 108-1 may not like all current conditions and/or settings associated with subscriber domain 150-1, graphical user interface 123-3 notifies and requests the user 108-1 to specify which of multiple environmental parameters, conditions, settings, etc., associated with the subscriber domain 150-1 the user 108-1 likes at a time of providing the feedback (such as selection of symbol 505).

In one embodiment, to create graphical user interface 123-3, the monitor resource 240 accesses the monitor information 285 to identify current conditions in or control settings that may be liked by the user 108-1. The monitor resource 240 produces the graphical user interface 123-3 to indicate current conditions/control settings of resources 146 as detected by the monitor resource 240 (and monitor information 285). Via input to the graphical user interface 123-3, the user 108-1 is able to indicate which if any of the different possible conditions the user 108-1 likes around a time of selecting symbol 505.

As shown, the user can select the checkbox 530-1 in graphical user interface 123-3 to indicate that they like all of the current settings displayed in graphical user interface 123-3. Selection of checkbox 530-1 causes all of the other checkboxes 530-2, 530-3, 530-4, 530-5, etc., to be selected.

If desired, the user 108-1 can select less than all of the checkboxes 530. For example, the user 108-1 may only like current setting temperature setting of 73° and the television volume of 22. In such an instance, the user would provide input and check only checkbox 530-2 and checkbox 530-4 of graphical user interface 123-3.

As another example, the user 108-1 may only like current television channel selection of 620 and light control settings equal to 30% of full brightness. In such an instance, the user would provide input and check only checkbox 530-3 and checkbox 530-5 of graphical user interface 123-3.

In this manner, the user 108-1 can specify one or more desired settings and/or environmental conditions in subscriber domain 150-1. In response to selecting the submit button in graphical user interface 123-3, the communication device 195 communicates the selections in graphical user interface 123-3 to monitor resource 240 via communications 520-5. Based on the received communications 520-5, the monitor resource 240 creates a corresponding profile 545 associated with user 108-1 indicating environmental conditions and or control settings liked (or potentially disliked) by the respective user 108-1. Thus, the domain management resource 140 produces a respective profile 545 for the user 108-1 based on the provided feedback.

In one embodiment, the profile information 545 generated by the domain management resource 140 can include a recording of the current environmental conditions and/or settings associated with controlled resources to which the feedback (such as selection of symbol 505, selection of symbol 510, selection of submit button in graphical user interface 123-3, etc.) pertains. As mentioned, based on the feedback and corresponding record of an environmental conditions and/or settings of controlled resources at a time of receiving the feedback, the domain management resource derives a control rule to control future environmental settings in the subscriber domain 150-1.

As mentioned, the profile information 545 associated with a respective user can include feedback from one or more times of selecting symbol 505 and/or submit button in graphical user interface 123-3).

In one embodiment, the monitor resource 240 receives first feedback from the user 108-1 at a first time and receives second feedback from the user 108-1 at a second time when the user 108-1 indicates that they like current conditions and/or control settings associated with subscriber domain 150-1. In such an instance, the monitor resource 240 produces profile information 545 associated with the user 108-1 to include at least: i) a record of first environmental settings of the domain to which the first feedback pertains, and ii) a record second environmental settings of the domain to which the second feedback pertains.

As further discussed below, the rules engine 255 can be configured to derive a proposed control rule or control setting based on a combination of at least: i) the first environmental settings associated with the first feedback, and ii) the second environmental settings associated with the second feedback.

In accordance with further more specific embodiments, based on stored profile information 545 associated with a respective user 108-1, the rules engine 255 identifies settings or sensed conditions via multiple resources 145 and 146 that contribute to controlling the current environmental conditions of the domain to which the feedback pertains. The rules engine 255 produces a proposed control rule (setting) to control the multiple resources in a manner as indicated by the liked settings or environmental conditions.

More specifically, in one embodiment, based on the settings and/or environmental conditions at the time of receiving feedback (such as that user liked or disliked current conditions), the rules engine 255 can be configured to produce a proposed control rule for presentation to the corresponding user 108-1. In a manner as previously discussed, if the user 108-1 approves of the proposed control rule, the rules engine 255 produces a corresponding control rule (such as control rule 561) for controller 290 to control subscriber domain 150-1. Thus, the rules engine 255 can be configured to utilize a control setting (such as control rule 561) to program domain management resource 140 associated with the subscriber domain 150-1.

Subsequent to approval and programming of domain management resource 140 with rule 561, the controller 290 monitors current environmental conditions of the domain and utilizes the derived control setting to control the future environmental conditions of the subscriber domain 150-1 in accordance with control settings as specified by the control rule 561.

In one embodiment, as previously discussed, the domain management resource 140 can be configured to provide the user 108-1 with an opportunity to edit the proposed configuration setting (rule) prior to the proposed configuration setting being used to control settings associated with subscriber domain 150-1.

Embodiments herein are useful over conventional techniques because they provide one or more occupants in a subscriber domain with the ability to provide useful feedback indicating conditions in a domain that the respective occupants find favorable or unfavorable. Based on the different occupants likes, or dislikes, with respect to current settings or environmental conditions, the domain management resource 140 generates one or more proposed control rules for each of one or more users to control subscriber domain 150-1.

Figure 6:
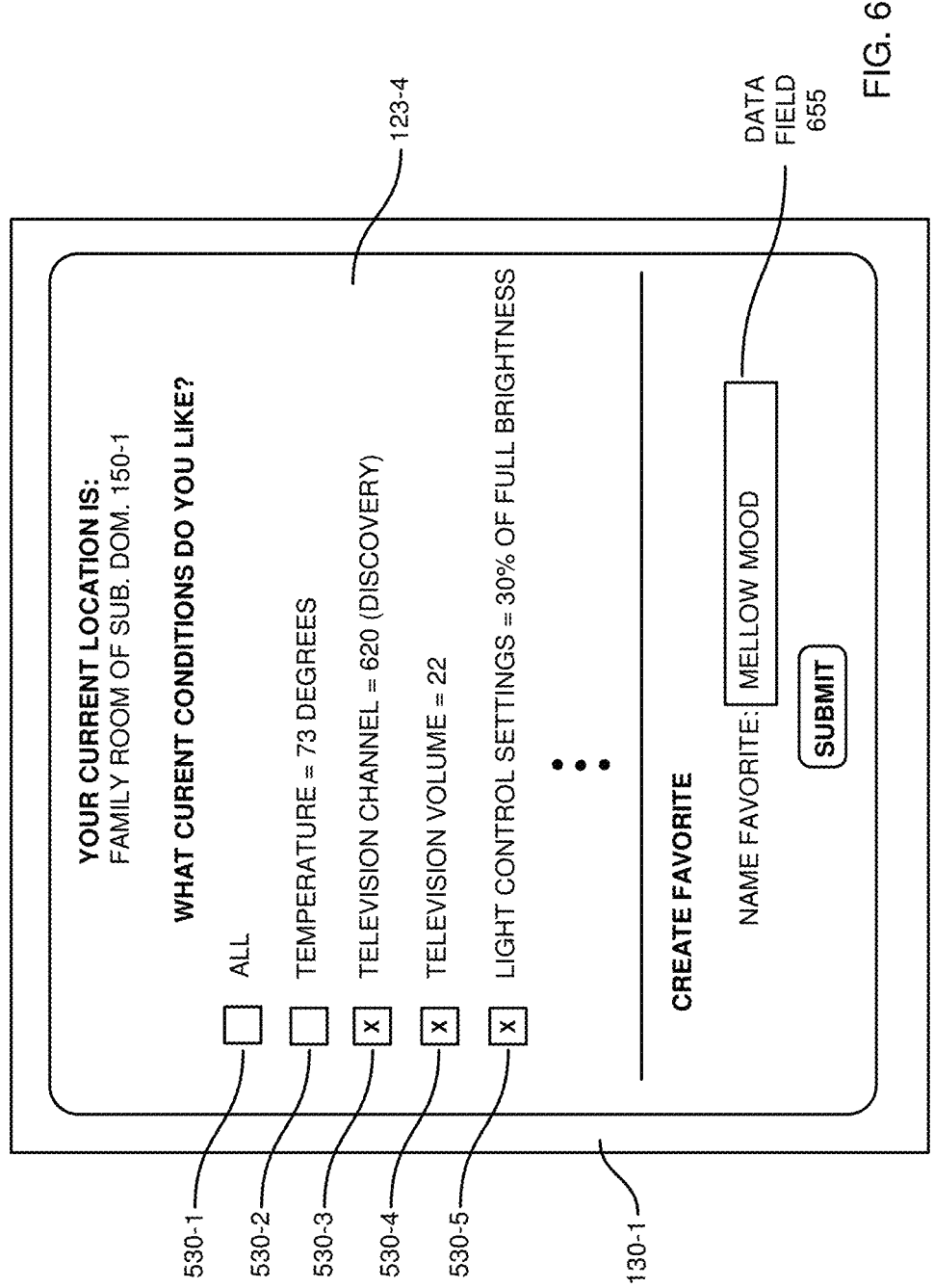
FIG. 6 is an example diagram illustrating a graphical user interface enabling a respective user to create a favorite control setting according to embodiments herein.

FIG. 6 is an example diagram illustrating a user providing feedback according to embodiments herein.

Note that in accordance with further embodiments, the user 108-1 may provide input notifying domain management resource 140 that the user would like to create a favorite setting for subsequent selection by the user. In accordance with such an embodiment, the domain management resource initiates display of graphical user interface 123-4 on display screen 130-1 for user 108-1. Via graphical user interface 123-4, the user 108-1 selects corresponding desired setting/conditions as previously discussed. The user 108-1 selects checkboxes 530-3, 530-4, and 530-5 (indicating desired control settings and/or environmental conditions). Additionally, note that graphical user interface 123-4 includes data field 655 in which the user is able to name a respective favorites setting. In this example embodiment, the user 108-1 names a respective setting "MELLOW MOOD" as shown in data field 655.

The user 108-1 then selects the SUBMIT button in graphical user interface 123-4. This notifies the domain management resource 140 of the different control settings and/or environmental conditions that are to be used to create a respective favorites setting. In this example embodiment, the rules engine 255 utilizes the settings as selected in graphical user interface 123-4 to produce a respective control rule (such as control rule 651) associated with user 108-1 in subscriber domain 150-1.

Assume in this example embodiment that in response to selection of the submit button in graphical user interface 123-4, the rules engine 255 produces control rule 661 to control the subscriber domain 150-1 in accordance with the favorite settings (MELLOW MOOD) as specified in graphical user interface 123-4.

Figure 7:
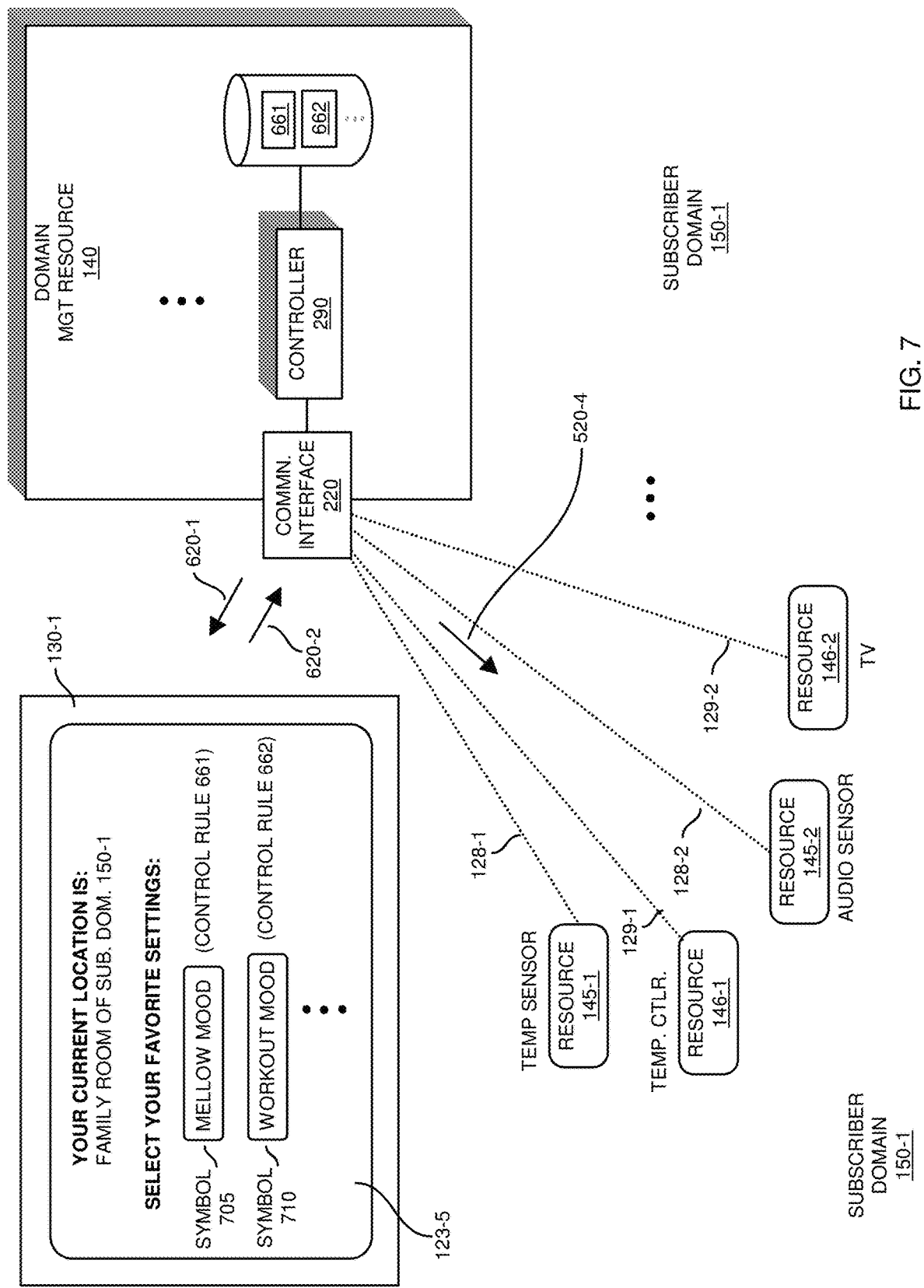
FIG. 7 is an example diagram illustrating display and selection of a favorite setting to control conditions/resources in a respective subscriber domain according to embodiments herein.

FIG. 7 is an example diagram illustrating selection of a favorite setting to control a respective subscriber domain according to embodiments herein.

As shown in FIG. 7, the user 108-1 operating communication device 195 can be prompted of the different available favorite control settings available for selection. More specifically, assume in this example embodiment that the user 108-1 operates communication device 195 to display selectable favorite settings (mellow mood, workout mood, etc.) associated with a location (such as the family room) in which the user 108-1 currently resides.

In one embodiment, prior to displaying available favorite settings, the domain management resource 140 detects that the user 108-1 currently resides in the family room of subscriber domain 150-1. The domain management resource 140 then identifies any control rules (favorite settings) that are available to the user 108-1 to control conditions in the family room of subscriber domain 150-1.

As further shown in FIG. 7, in response to detecting presence of the user (and/or communication device 195) in the family room to which the selectable control options (control rule 661, control rule 662, etc.) pertains, via communications 620-1, the domain management resource 140 initiates display of the selectable options (MELLOW MOOD, WORKOUT MOOD, etc.) in graphical user interface 123-5 on display screen 130-1.

The user 108-1 viewing graphical user interface 123-5 can select amongst the different symbols (symbol 705, symbol 710, etc.) to control settings in the subscriber domain 150-1.

Assume that the user 108-1 selects symbol 705 (control rule 661). In response to receiving user selection of the selectable option as indicated by symbol 705, the communication device 195 operated by user 108-1 transmits a command via communications 620-2 to controller 290 of domain management resource 140.

In response to receiving communications 620-2 (selection of control rule 661), the controller 290 controls environmental parameters and/or control settings of the family room in a manner as specified by the selected control rule 661. For example, when selecting the favorite labeled MELLOW MOOD, the controller 290 controls resource 146-2 to playback content on channel 620; the controller 290 controls a volume of resource 146-2 to be a volume level of 22; the controller 290 controls light settings associated with resource 146-3 to 30% of full brightness; and so on.

Any of multiple different occupants residing in subscriber domain 150-1 can produce favorite settings associated with a particular room in the subscriber domain 150-1. Subsequent to creating the favorite settings and corresponding control rules, a respective user is able to view the corresponding favorite settings that they have created and select amongst the different control rules (favorite settings) to control the respective subscriber domain 150-1.

The embodiment of producing favorite settings and corresponding control rules is useful because the corresponding user is able to create a control rule and then control many parameters in a respective subscriber domain via selection of a single button (such as symbol 705, symbol 710, etc.). This alleviates the user from having to manually control each of the different resources 146 to control the subscriber domain 150-1 to desired settings.

Figure 8:
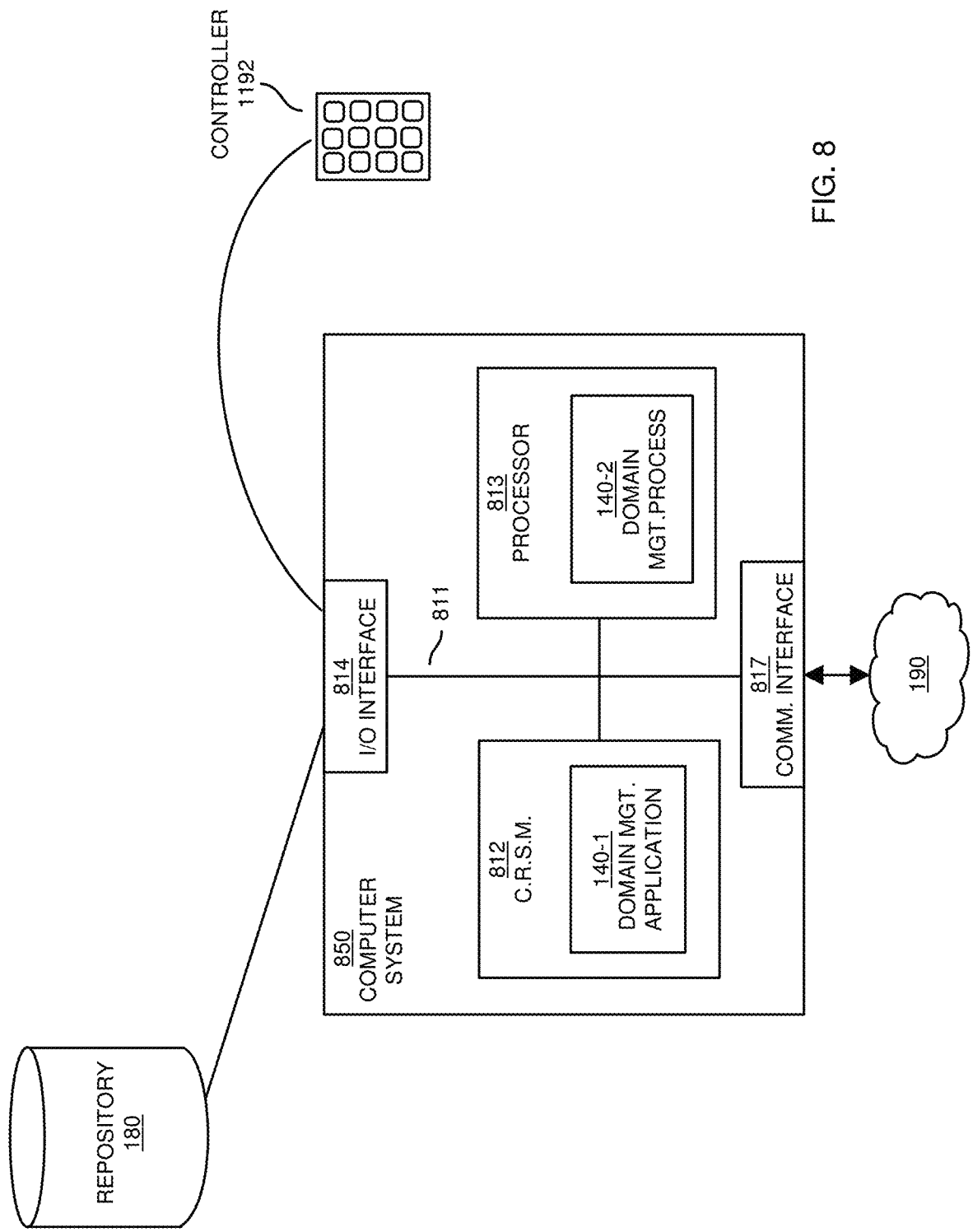
FIG. 8 is a diagram illustrating an example computer architecture in which to execute any of the functionality according to embodiments herein.

FIG. 8 is an example block diagram of a computer device for implementing any of the operations as discussed herein according to embodiments herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 480 and, if present, other devices such as a playback device, display screen, input resource 1192, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with domain management application 140-1 (e.g., software, firmware, etc.) executed by processor 813. Domain management application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in domain management application 140-1 stored on computer readable storage medium 812.

Execution of the domain management application 240-1 produces processing functionality such as domain management process 140-2 in processor 813. In other words, the domain management process 140-2 associated with processor 813 represents one or more aspects of executing domain management application 140-1 within or upon the processor 813 in the computer system 850.

Those skilled in the art will understand that the computer system 850 can include other processes and/or software and hardware components, such as an operating system that controls allocation and use of hardware resources to execute domain management application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 8 and 9. Note that the steps in the flowcharts below can be executed in any suitable order.

Figure 9:
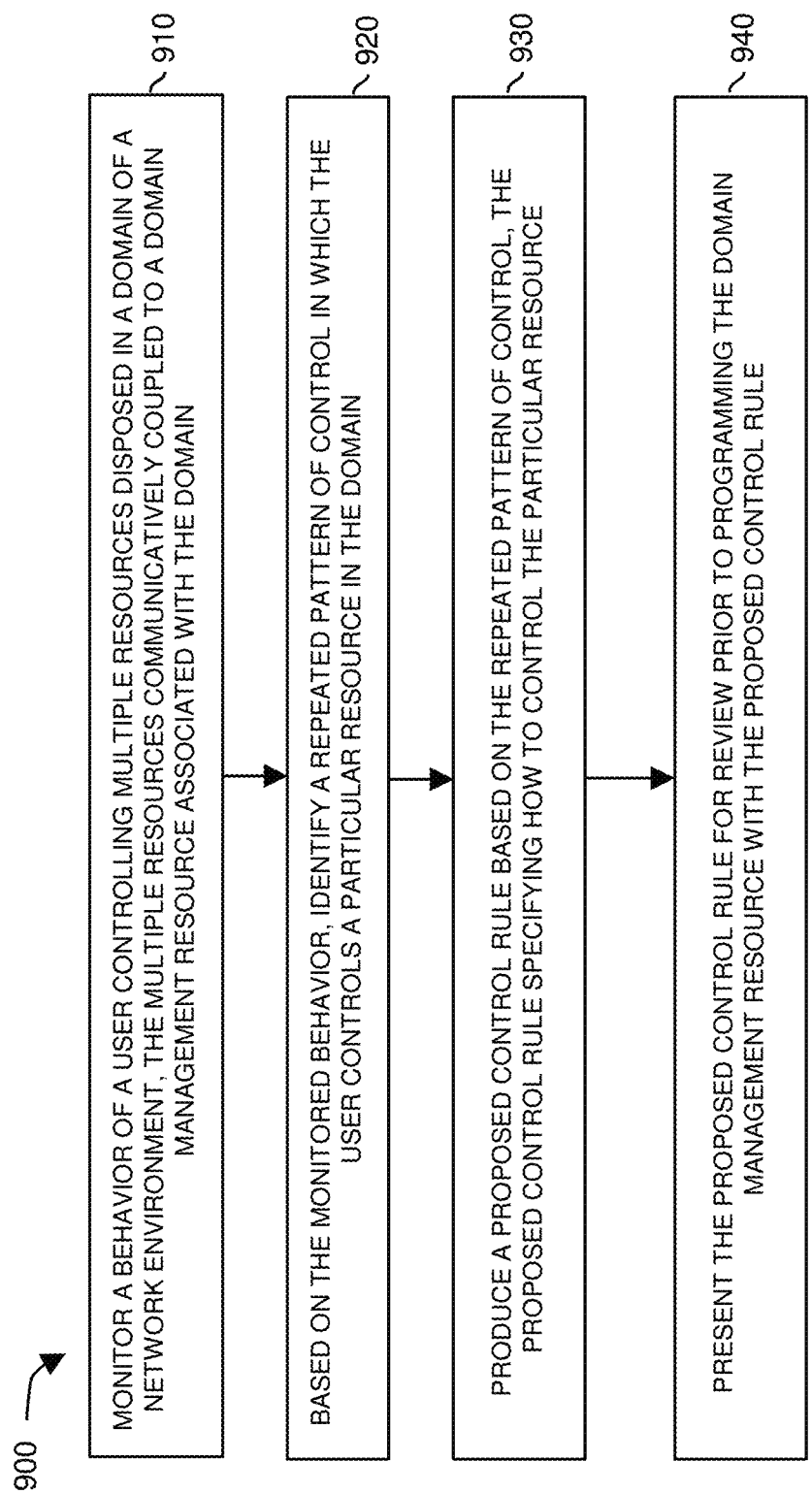

FIG. 9 is a flowchart 900 illustrating an example method according to embodiments. Note that there will be some overlap with respect to concepts as discussed above.

In processing block 910, the domain management resource 140 monitors a behavior of a user controlling multiple resources disposed in a domain of a network environment 100. The multiple resources are communicatively coupled to a domain management resource 140 associated with the domain.

In processing block 920, based on the monitored behavior, the domain management resource 140 identifies a repeated pattern of control in which the user controls a particular resource in the domain.

In processing block 930, the domain management resource 140 producing a proposed control rule based on the repeated pattern of control, the proposed control rule specifying how to control the particular resource.

In processing block 940, the domain management resource 140 initiates presenting the proposed control rule for review prior to programming the domain management resource 140 with the proposed control rule.

FIG. 10 is a flowchart 1000 illustrating an example method according to embodiments. Note that there will be some overlap with respect to concepts as discussed above.

In processing block 1010, the domain management resource 140 receives feedback generated by a user. The feedback indicates that the user likes current environmental conditions in a domain of a network environment 100 in which the user resides.

In processing block 1020, the domain management resource 140 produces a profile for the user. The profile records the current environmental conditions to which the feedback pertains.

In processing block 1030, the domain management resource 140 derives a control setting to control future environmental settings in the domain based on the feedback and corresponding recorded environmental conditions in the profile.

Note again that techniques herein are well suited for use in controlling conditions in a respective subscriber domain of a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving feedback generated by a user, the feedback indicating: i) multiple environmental parameters selected by the user, and ii) that the user likes current environmental conditions for the multiple environmental parameters in a domain of a network environment in which the user resides;
   producing a profile for the user, the profile recording the current environmental conditions for the multiple environmental parameters to which the feedback pertains;
   deriving control settings to control future environmental settings in the domain based on the feedback and corresponding recorded environmental conditions in the profile for the multiple environmental parameters selected by the user; and
   wherein the user simultaneously selects the multiple environmental parameters included in the feedback via input to a graphical user interface.

2. The method as in claim 1 further comprising:
   initiating display of a selectable symbol on a display screen viewed by the user, selection of the selectable symbol by the user producing the feedback indicating that the user likes the current environmental conditions of the domain at a time of the selection.

3. The method as in claim 1 further comprising:
   initiating display of the graphical user interface through which the user provides the feedback; and
   in response to receiving input to the graphical user interface, initiating display of a notification requesting the user to specify the multiple environmental parameters.

4. The method as in claim 1, wherein receiving the feedback includes: receiving first feedback from the user at a first time and receiving second feedback from the user at a second time;
   wherein producing the profile associated with the user includes: i) for the first feedback, recording first environmental settings of the domain to which the first feedback pertains, and ii) for the second feedback, recording second environmental settings of the domain to which the second feedback pertains; and
   wherein deriving the control settings includes: producing the control settings based on a combination of: i) the first environmental settings associated with the first feedback, and ii) the second environmental settings associated with the second feedback.

5. The method as in claim 1 further comprising:
   utilizing the control settings to program a domain management resource associated with the domain, the domain management resource monitoring current environmental conditions of the domain and utilizing the control settings to control the future environmental conditions of the domain in accordance with the control settings as specified by the profile.

6. The method as in claim 1, wherein deriving the control setting includes:
   identifying settings of multiple resources that contribute to controlling the current environmental conditions of the domain to which the feedback pertains; and
   producing the control settings to control the multiple resources in a manner as indicated by the identified settings.

7. The method as in claim 1 further comprising:
   associating the control settings with a particular room in the domain; and
   creating a selectable control option to execute the control settings based on a corresponding command from the user.

8. The method as in claim 7 further comprising:
in response to detecting presence of the user in the particular room to which the selectable control option pertains, initiating display of the selectable control option; and
in response to receiving selection of the selectable control option by the user, controlling environmental parameters of the particular room in a manner as specified by the control settings.

9. A computer system comprising:
computer processor hardware; and
a hardware storage resource coupled to the computer processor hardware, the hardware storage resource storing instructions that, when executed by the computer processor hardware, causes the computer processor hardware to:
  receive feedback generated by a user, the feedback simultaneously indicating: i) multiple environmental parameters selected by the user, and ii) that the user likes current environmental conditions for the selected multiple environmental parameters in a domain of a network environment in which the user resides;
  produce a profile for the user, the profile recording the current environmental conditions for the multiple environmental parameters selected by the user to which the feedback pertains; and
  derive control settings to control future environmental settings in the domain based on the feedback and corresponding recorded environmental conditions in the profile for the multiple environmental parameters selected by the user; and
  utilize the control settings to program a domain management resource associated with the domain, the domain management resource monitoring current environmental conditions of the domain and utilizing the control settings to control the future environmental conditions of the domain in accordance with control settings as specified by the profile of recorded environmental conditions.

10. A computer system comprising:
computer processor hardware; and
a hardware storage resource coupled to the computer processor hardware, the hardware storage resource storing instructions that, when executed by the computer processor hardware, causes the computer processor hardware to:
  receive feedback generated by a user, the feedback simultaneously indicating: i) multiple environmental parameters selected by the user, and ii) that the user likes current environmental conditions for the selected multiple environmental parameters in a domain of a network environment in which the user resides;
  produce a profile for the user, the profile recording the current environmental conditions for the multiple environmental parameters selected by the user to which the feedback pertains; and
derive control settings to control future environmental settings in the domain based on the feedback and corresponding recorded environmental conditions in the profile for the multiple environmental parameters selected by the user;
initiate display of a selectable symbol on a display screen viewed by the user, selection of the selectable symbol by the user producing the feedback indicating that the user likes the current environmental conditions of the domain at a time of the selection.

11. A computer system comprising:
computer processor hardware; and
a hardware storage resource coupled to the computer processor hardware, the hardware storage resource storing instructions that, when executed by the computer processor hardware, causes the computer processor hardware to:
  receive feedback generated by a user, the feedback simultaneously indicating: i) multiple environmental parameters selected by the user, and ii) that the user likes current environmental conditions for the selected multiple environmental parameters in a domain of a network environment in which the user resides;
  produce a profile for the user, the profile recording the current environmental conditions for the multiple environmental parameters selected by the user to which the feedback pertains;
  derive control settings to control future environmental settings in the domain based on the feedback and corresponding recorded environmental conditions in the profile for the multiple environmental parameters selected by the user;
  initiate display of a graphical user interface through which the user provides the feedback; and
  in response to receiving input to the graphical user interface, initiate display of a notification requesting the user to specify which of multiple environmental parameters associated with the domain the user likes at a time of providing the feedback.

12. The computer system as in claim 9, wherein receiving the feedback includes: receiving first feedback from the user at a first time and receiving second feedback from the user at a second time;
  wherein producing the profile associated with the user includes: i) for the first feedback, recording first environmental settings of the domain to which the first feedback pertains, and ii) for the second feedback, recording second environmental settings of the domain to which the second feedback pertains; and
  wherein deriving the control setting includes: producing the control setting based on a combination of: i) the first environmental settings associated with the first feedback, and ii) the second environmental settings associated with the second feedback.

13. The computer system as in claim 9, wherein the computer processor hardware is further operable to:
  identify settings of multiple resources that contribute to controlling the current environmental conditions of the domain to which the feedback pertains; and
  produce the control settings to control the multiple resources in a manner as indicated by the identified settings.

14. The computer system as in claim 9, wherein the computer processor hardware is further operable to:
  associate the control settings with a particular room in the domain; and
  create a selectable option to execute the control settings.

15. The computer system as in claim 14, wherein the computer processor hardware is further operable to:
  in response to detecting presence of the user in the particular room to which the selectable option pertains, initiate display of the selectable option; and in response to receiving selection of the selectable option by the user, control environmental parameters of the particular room in a manner as specified by the control settings.

16. The method as in claim 1 further comprising:
receiving input from the user indicating a reference name to be assigned to the control settings derived from the feedback.

17. The method as in claim 16, wherein the reference name indicates attributes of the user providing the feedback.

18. The method as in claim 1 further comprising:
in response to receiving a command from the user to apply the control settings to the domain, controlling environmental conditions of the domain in a manner as specified by the control settings.

19. The method as in claim 1 further comprising:
initiating display of the graphical user interface to the user;
via the graphical user interface, in a listing, displaying the multiple environmental parameters associated with the domain; and
wherein the feedback from the user indicates the multiple environmental parameters selected by the user from the listing.

20. The method as in claim 19, wherein the selection of the multiple environmental parameters includes fewer-than-all of the multiple environmental parameters displayed in the listing.

21. The method as in claim 19, wherein each of the environmental parameters selected from the listing indicates a corresponding current setting for a respective environmental parameter associated with the domain.

22. The method as in claim 21, wherein the multiple environmental parameters selected by the user from the listing includes a first parameter indicating temperature and a second environmental parameter indicating a setting of a device present in the domain;
wherein the listing in the graphical user interface indicates a current temperature setting for the first parameter; and
wherein the listing in the graphical user interface indicates a current device setting for the second parameter.

23. The method as in claim 1, wherein the feedback pertains to a particular location in the domain as indicated by a mobile communication device operated by the user.

24. A method comprising:
receiving feedback generated by a user, the feedback indicating: i) multiple environmental parameters selected by the user, and ii) that the user likes current environmental conditions for the multiple environmental parameters in a domain of a network environment in which the user resides;
producing a profile for the user, the profile recording the current environmental conditions for the multiple environmental parameters to which the feedback pertains;
deriving control settings to control future environmental settings in the domain based on the feedback and corresponding recorded environmental conditions in the profile for the multiple environmental parameters selected by the user;
wherein the feedback pertains to a particular location in the domain as indicated by a mobile communication device operated by the user;
wherein the control settings are first control settings applicable to the particular location, the method further comprising:
storing second control settings for the particular location as specified by the user;

in response to detecting presence of the mobile communication device at the particular location, displaying a notification indicating the first control settings and the second control settings associated with the particular location; and
in response to receiving input from the user selecting the first control settings, controlling the environmental parameters at the particular location as specified by the first control settings.

25. The method as in claim 1 further comprising:
associating the control settings with the user; and
in response to detecting presence of the user in the domain, controlling the environmental parameters of the domain as specified by the control settings.

26. The method as in claim 1 further comprising:
producing the control settings based on the current environmental conditions of the multiple environmental parameters selected by the user at a time of receiving the feedback.

27. The method as in claim 1 further comprising:
receiving multiple feedback messages generated by the user at multiple different times, the feedback messages indicating whether the user liked current environmental settings in the domain; and
deriving the control settings based on the multiple feedback messages.

28. The method as in claim 1 further comprising:
initiating display of a user interface to the user;
via the user interface, displaying the multiple environmental parameters associated with the domain, the multiple environmental parameters including a first environmental parameter and a second environmental parameter;
displaying a first numerical value in the user interface, the first numerical value indicating a current setting of the first environmental parameter;
displaying a second numerical value in the user interface, the second numerical value indicating a current setting of the second environmental parameter; and
wherein the feedback from the user indicates the multiple environmental parameters selected by the user from the user interface.

29. A method comprising:
receiving feedback generated by a user, the feedback indicating: i) multiple environmental parameters selected by the user, and ii) that the user likes current environmental conditions for the multiple environmental parameters in a domain of a network environment in which the user resides;
producing a profile for the user, the profile recording the current environmental conditions for the multiple environmental parameters to which the feedback pertains; and
deriving control settings to control future environmental settings in the domain based on the feedback and corresponding recorded environmental conditions in the profile for the multiple environmental parameters selected by the user;
the method further comprising:
initiating display of a user interface to the user;
via the user interface, displaying the multiple environmental parameters associated with the domain, the multiple environmental parameters including a first environmental parameter and a second environmental parameter;

displaying a first numerical value in the user interface, the first numerical value indicating a current setting of the first environmental parameter;

displaying a second numerical value in the user interface, the second numerical value indicating a current setting of the second environmental parameter; and wherein the feedback from the user indicates the multiple environmental parameters selected by the user from the user interface, the method further comprising: in response to receiving selection of the first environmental parameter displayed in the user interface, producing a first visual indication in the user interface indicating selection of the first environmental parameter; and in response to receiving selection of the second environmental parameter displayed in the user interface, producing a second visual indication in the user interface indicating selection of the second environmental parameter.

30. A method comprising:

receiving feedback generated by a user, the feedback indicating: i) multiple environmental parameters selected by the user, and ii) that the user likes current environmental conditions for the multiple environmental parameters in a domain of a network environment in which the user resides;

producing a profile for the user, the profile recording the current environmental conditions for the multiple environmental parameters to which the feedback pertains;

deriving control settings to control future environmental settings in the domain based on the feedback and corresponding recorded environmental conditions in the profile for the multiple environmental parameters selected by the user; and wherein the multiple environmental parameters indicated by the feedback includes a first environmental parameter and a second environmental parameter simultaneously submitted by the user.

31. A method comprising:

receiving feedback generated by a user, the feedback indicating: i) multiple environmental parameters selected by the user, and ii) that the user likes current environmental conditions for the multiple environmental parameters in a domain of a network environment in which the user resides;

producing a profile for the user, the profile recording the current environmental conditions for the multiple environmental parameters to which the feedback pertains;

deriving control settings to control future environmental settings in the domain based on the feedback and corresponding recorded environmental conditions in the profile for the multiple environmental parameters selected by the user; and wherein the user simultaneously submits selection of the multiple environmental parameters in the feedback.

32. The method as in claim 1 further comprising:

displaying the graphical user interface through which the user provides the feedback; and in response to receiving input to the graphical user interface, displaying a notification requesting the user to specify which of multiple environmental parameters associated with the domain the user likes at a time of providing the feedback.

33. The method as in claim 1 further comprising:

simultaneously displaying the multiple environmental parameters on a display device for viewing by the user; and receiving the feedback in response to the user providing input with respect to the display device from which the user selects each of the multiple environmental parameters.

34. The method as in claim 33, wherein the multiple environmental parameters selected by the user includes a first environmental parameter and a second environmental parameter simultaneously displayed on the display device.

35. The method as in claim 34 further comprising:

for the first environmental parameter displayed on the display device, displaying a first numerical value on the display device, the first numerical value indicating a current setting of the first environmental parameter in the domain;

for the second environmental parameter displayed on the display device, displaying a second numerical value on the display device, the second numerical value indicating a current setting of the second environmental parameter in the domain.

36. The method as in claim 35, wherein the user individually selects each of the first environmental parameter and the second environmental parameter.

* * * * *